US011986784B2

(12) United States Patent
Ashe et al.

(10) Patent No.: US 11,986,784 B2
(45) Date of Patent: May 21, 2024

(54) MIXER FOR FLOW SYSTEMS

(71) Applicant: ASHE MORRIS LTD, Warrington (GB)

(72) Inventors: Robert Ashe, Runcorn (GB); Gary Eccleson, Runcorn (GB); Christopher Gaunt, Runcorn (GB)

(73) Assignee: ASHE MORRIS LTD., Warrington (GB)

( * ) Notice: Subject to any disclaimer, the term of this patent is extended or adjusted under 35 U.S.C. 154(b) by 465 days.

(21) Appl. No.: 16/651,679

(22) PCT Filed: Sep. 28, 2018

(86) PCT No.: PCT/EP2018/076428
§ 371 (c)(1),
(2) Date: Mar. 27, 2020

(87) PCT Pub. No.: WO2019/063774
PCT Pub. Date: Apr. 4, 2019

(65) Prior Publication Data
US 2020/0261867 A1 Aug. 20, 2020

(30) Foreign Application Priority Data
Sep. 28, 2017 (GB) ..................................... 1715735

(51) Int. Cl.
*B01F 5/06* (2006.01)
*B01F 15/06* (2006.01)
(Continued)

(52) U.S. Cl.
CPC ............ *B01F 25/431* (2022.01); *B01F 35/92* (2022.01); *B01F 25/4317* (2022.01);
(Continued)

(58) Field of Classification Search
CPC .... B01J 19/28; B01J 19/0066; B01J 19/1812; B01F 29/64; B01F 29/31; B01F 29/252; B01F 25/431
See application file for complete search history.

(56) References Cited

U.S. PATENT DOCUMENTS 1,812,823 A * 6/1931 Eggert .................. B01F 35/145
366/56
2006/0273474 A1* 12/2006 Witte .................. B01F 25/4521
261/DIG. 26
2015/0298095 A1* 10/2015 Ashe ................. B01F 25/43161
435/293.1

FOREIGN PATENT DOCUMENTS

CH 202841 A 2/1939
EP 1716915 A1 11/2006
(Continued)

OTHER PUBLICATIONS

International Search Report and Written Opinion dated Jan. 22, 2019, Application No. PCT/EP2018/076428, filed Sep. 28, 2018.
(Continued)

*Primary Examiner* — Elizabeth Insler
(74) *Attorney, Agent, or Firm* — The Dobrusin Law Firm, P.C.; Daniela M. Thompson-Walters

(57) ABSTRACT

A mixer system comprising a sealed tube (2) provided with inlets and outlets (4,5) for a process fluid which is rotatable in arcs around the longitudinal axis of the tube (3) and contains one or more blades (11) mounted at each end on a blade carrier (10) supported within the tube (3) in a manner that allows the one or more blades (11) to rotate in the same direction and angular velocity (in degrees per second) as the tube (3) rotates in arcs and the use of such a system as a reactor and/or for mixing.

20 Claims, 3 Drawing Sheets

(51) Int. Cl.
*B01F 25/431* (2022.01)
*B01F 35/92* (2022.01)
*B01F 29/64* (2022.01)
*B01F 31/10* (2022.01)
*B01F 35/90* (2022.01)

(52) U.S. Cl.
CPC ....... *B01F 25/431971* (2022.01); *B01F 29/64* (2022.01); *B01F 31/10* (2022.01); *B01F 2035/98* (2022.01); *B01F 2035/99* (2022.01)

(56) References Cited

FOREIGN PATENT DOCUMENTS

| | | | | | |
|---|---|---|---|---|---|
| GB | 882275 | A | * | 11/1961 | .............. B01F 29/64 |
| GB | 882275 | A | | 11/1961 | |
| GB | 2507487 | A | | 5/2014 | |

OTHER PUBLICATIONS

GB Search Report, dated Mar. 23, 2018, Application No. GB1715735.5.

* cited by examiner

MIXER FOR FLOW SYSTEMS

FIELD

The present invention relates to an improved mixer for flowing materials.

BACKGROUND

During passage through the system, a chemical or physical change may take place which is termed a process operation and the flowing fluid is a process material. Such a process operation includes but is not limited to mixing, chemical reaction, enzymatic reaction, cell growth, crystallisation and polymerisation. The process operation may also be an extraction. The process material is free flowing and may be homogenous liquid or a mixture of phases such as immiscible liquids, gas liquid mixtures, liquids with particulate solids such as slurries and suspensions, supercritical fluids or a combination of these.

The terms mixer and mixing are used to include simple mixing of materials and also to mixing of fluids which involves a chemical or physical change such as chemical reactions, enzymatic reactions, cell growth, polymerisation or physical change such as crystallisation. The term fluid includes liquids, gasses, slurries, suspensions and mixtures thereof. The fluid is a flowing material.

Historically, these process operations and others have predominantly been performed in batch reactors. These are large stirred batch tanks which may have heating/cooling surfaces and they process one tank volume at a time. The continuous system of this invention involves material continuously flowing along a tube and allows one to process multiple tube volumes without interruption and therefore has a higher output per unit volume than batch equipment. This allows the use of a physically smaller apparatus which is more energy efficient and inherently safer than batch equipment. Reduced size also contributes to better performance as the mixing distances are shorter and better heat transfer as the ratio of heat transfer area to volume is increased. This improved performance contributes to improved product yield and improved product purity subject to chemistry.

GB2507487 describes a mixer comprising a tube body which holds a fluid and is rotated in reversing arcs. Internal static and dynamic mixing elements work together to promote mixing of the fluid as the tube rotates. The mixers are supported by a central shaft. The use of a central shaft however is not preferred. Furthermore it has a low velocity and therefore makes an insignificant contribution to mixing. Additionally it obstructs the mixing pattern of fluid spilling off the mixing blades. It also makes assembly more difficult to mount mixing blades which rotate at the same velocity and direction as the tube.

SUMMARY

The present invention therefore provides a mixer comprising a sealed tube provided with inlets and outlets for the process fluid and said tube is rotatable in arcs around the longitudinal axis of the tube containing a mixing element comprising one or more blades mounted at each end on a blade carrier and said blade carrier is supported within the tube in a manner that allows the one or more blades to rotate in the same direction and angular velocity (in degrees per second) as the tube rotates in arcs.

The present invention also provides a system as described above wherein the mixing element rotates in the same direction and angular velocity as the tube as the tube rotates in arcs although the mixing element is free to rotate at a different angular velocity to the tube during the transition phase between one arc of rotation of the tube and the next.

DETAILED DESCRIPTION

Figure 1:
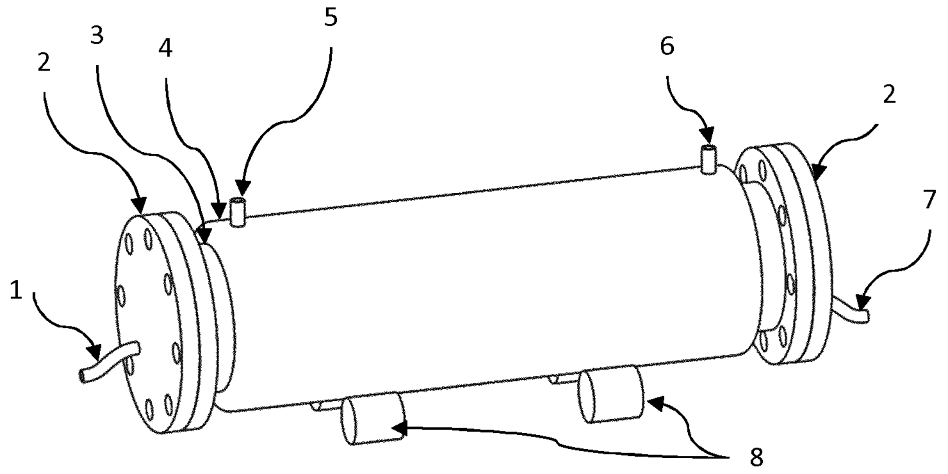
FIG. 1 illustrates a mixing system.

The present invention therefore provides a mixer comprising a sealed tube provided with inlets and outlets for the process fluid and said tube is rotatable in arcs around the longitudinal axis of the tube containing a mixing element comprising one or more blades mounted at each end on a blade carrier and said blade carrier is supported within the tube in a manner that allows the one or more blades to rotate in the same direction and angular velocity (in degrees per second) as the tube rotates in arcs.

The present invention also provides a system as described above wherein the mixing element rotates in the same direction and angular velocity as the tube as the tube rotates in arcs although the mixing element is free to rotate at a different angular velocity to the tube during the transition phase between one arc of rotation of the tube and the next.

The tube is preferably horizontal or substantially horizontal.

The blades are fixed relative to the blade carrier. Blade carriers are located at each end of the tube and supported by the tube or end flange and are preferably mounted so that the blades are not touching the tube walls. The centre of rotation of the mixing element is within the inner third of the tube diameter and more preferably at the centre of the tube. The supports for the blade carriers may be fixed such that they rotate at the same angular velocity and direction as the tube. This is referred to here as the tube drive stroke. The supports for the blade carriers may also allow the blade carriers to rotate at a different angular velocity and/or direction to the tube and said difference can be caused by the drag effect of the process material. This is referred to here as the fluid drive stroke. The whole cycle of each rotating arc may be the tube drive stroke. It is preferred that a combination of the tube drive stroke and the fluid drive stroke is used. To achieve a combination of the two, the mixing element needs to be free to rotate but the degree of free rotation is limited by one and preferably two travel stops. These stops are fixed to the tube or end flange and limit the degree of free rotation of the mixing element. The travel stops push the mixing element during the tube drive stroke.

The shape of the tube is preferably round but other shapes may be used. The tube is preferably horizontal and of a length that is preferably at least twice the diameter of the tube and more preferably greater than 3 times the diameter and even more preferably greater than 5 times the diameter. The length of the tube may be selected according to the operation to be performed within the tube however the preferred length is between 500 mm and 2 metres. Other lengths can be used according to need. The preferred tube diameter is between 50 mm and 1 metre. Other tube diameters can be used according to need.

The long axis of the tube is the axial plane and axial mixing means that fluid elements within the tube change position in relation to other fluid elements within the axial plane. The radial plane is at right angles to the axial plane and radial mixing means that fluid elements change position in relation to other fluid elements within the radial plane. The desired mixing regime gives a high ratio of radial to axial mixing. This ensures a narrower residence time distribution of process material within the reactor which in turn leads to improved residence time control for improved product yield and quality. Different process fluid phases may travel at different speeds through the system and in some cases in different directions.

The mixer of this invention is designed to give orderly flow for any given phase. Orderly flow means that any two fluid particles of a given phase entering the system at time zero discharge from the tube at substantially the same time. Orderly flow is a key factor in controlling residence time. The mixer may be used with high viscosity fluids but preferably with fluids with a viscosity of less than 100 centipoise.

The present invention provides a novel tubular mixer design in which there is no central shaft supporting the mixer blades between the blade carriers and which employs tubular systems rotating in arcs.

The tube rotates in arcs and the rotation may be driven by various means including compressed air, a motor with drive gears or other means. The preferred method is a motor which drives a belt or chain to turn the tube. It is preferred that a drive control system is used which includes sensors to detect when the tube has reached the end of an arc of rotation at which point a signal is sent to the drive system to reverse the direction of rotation. The maximum arc of rotation (Θ1) of the tube is 3600 but an angle of 1800 or less is preferred and an angle of 1500 or less is more preferred.

Fluid flow through the system is driven by external fluid feed such as by pumps, pressure transfer or gravity assisted flow. It is preferred that the system is run full with process material.

The mixing blade or blades are mounted on the blade carrier at a position between the centre of the tube and the tube wall. It is preferred that the blade or blades occupy the outer 70% of the radius of the tube and more preferably the outer 50% and even more preferably the outer 30%. It is preferred that the blade has no contact with the tube wall. It is preferably mounted at a distance of not more than 25 mm from the inner surface of the wall of the tube and more preferably not more than 15 mm from the wall. There is no central shaft to support the mixer blades between the two blade carriers.

It is preferred that the blade is straight in the axial plane. It is preferred that the blade is not straight in the radial plane and is bent or curved. This improves rigidity and also creates a bias in the fluid pumping to promote a slow rotation of fluid in the tube.

The tube rotates through an arc. In cases where low shear and long mixing times are applicable, the rotation speed may be up to 10 minutes or longer to complete a single arc. Where high shear or fast mixing time is required, the time to complete an arc may be less than 1 second. The drive mechanism for the rotation of the tube can be gears, a drive belt, a drive chain or pistons.

This system delivers a residence time distribution of the process material in the tube equivalent to 3 or more continuously stirred tank reactors in series and more preferably 5 or more.

It is preferred that tube travel stops are fitted to the external surface of the tube to prevent the tube from over rotating. Over rotation is undesirable and can lead to decoupling of the process and heat transfer connections to the tube. The stops may be based on sensors that signal the drive system to stop rotation in a given direction. They may also be mechanical stops whereby a solid projection on the tube makes contact with a solid projection which is fixed to a stationary surface which is not part of the tube. A combination of sensors and mechanical stops is preferred.

Mixing element travel stops are also used to restrict the free rotational movement of the blade carriers. The angle of separation (Θ2) of the travel stops varies according to the amount of fluid drive travel required of the mixer blades. The value of the fluid drive travel in degrees is Θ2×N per arc of rotation where N is the number of blades used. The minimum value of Θ2 is the blade width such that the mixers blades (11) are stationary relative to the tube (3) at all times. A value which is 100 or greater is preferred.

The tube may be provided with an external heating or cooling jacket for controlling the temperature of the process material within the tube. It is preferred that when used the external heating/cooling jacket is a spirally wound channel around the external surface of the tube. Such a channel carries heat transfer fluid and preferably has a cross sectional area of 2000 mm2 or less and more preferably 200 mm2 or less. The channel may be in the form of a welded half pipe wrapped around the tube or a pipe wrapped around the tube. It is preferred that said pipe is of a material with good thermal conductivity. Copper is the preferred material for the heat transfer fluid pipe. It is also preferred that the heat transfer channel comprises two or more spiral sections wrapped around the body of the tube each with their own feed and discharge pipes. Alternatively electrical heating may be used.

It is preferred that the mixer system of this invention is assembled by fabricating the blade carrier and blades separately. It is preferred that each blade is made from a single piece of material. Any number of blades can be used but the preferred number is 6 or less more preferably 2 to 4. The blades may be provided with holes or slots to improve mixing. The blades may also have cut outs at the edge. The blades may also use flexible or hinged surfaces which change geometry according to the direction of rotation.

One or more of the blades may be of a different weight to create an unbalanced system but it is preferred that the blades are of similar weight so that the mixer system is balanced so that the blades are driven only by the action of the travel stops and the fluid movement.

The system may be provided with one or more radial baffles along the internal length of the tube to restrict axial mixing. A system with 3 or more baffles is preferred and a system with 4 or more baffles is more preferred. The diameter of the baffles can be varied but a clearance between the baffles and the tube walls of 20 mm or less is preferred, a clearance of 10 mm or less being more preferred. The baffles may be fitted in different ways but the preferred method is to use slots in the baffle through which the mixer blades are fed. The baffles may be fixed in place in the axial plane using an interference fit or spacer bars may be used. They may also be welded or screwed in place.

The components of the system of this invention may be made with different materials to achieve the right combination of mechanical strength and chemical resistance required for the particular process operation. Materials that may be used include steel, stainless steel, alloys, exotic metals, plastic, ceramic materials and glass. Combinations of these materials where one material provides mechanical strength and a different material provides the chemical resistance may be used. Examples include steel coated with tantalum, glass, ceramic or plastic.

An emergency relief system may be used and the preferred system is a bursting disc mounted at the centre of the end flange.

The system of this invention is particularly useful as a continuous chemical reactor. It is also useful as an extractor.

The invention is illustrated by reference to the accompanying Figures.

FIG. 1 shows a complete system of the invention. A feed pipe (1) delivers process material into the system. The feed pipe has flexible elements to allow the tube to rotate. An end flange (2) seals the tube and provides access for cleaning and maintenance. Bolts (not shown) may be used as well as other types of clamping arrangement. A second end flange (2) is located at the other end of the tube. The tube (3) provides containment for the process material. The heat transfer jacket (4) adds and removes heat from the system. The heat transfer fluid connection (5) delivers heat transfer fluid to the heat transfer jacket and this fluid discharges through a heat transfer fluid discharge pipe (6). The product discharge pipe (7) is mounted at the other end of the tube. Flexibility in the heat transfer pipes and the process material feed/discharge pipes accommodate rotation of the tube. This can be done with flexible hoses or hard pipe with suitable bends to allow movement. The tube is mounted on rollers or bearings (8) to allow the tube to rotate. A drive mechanism is provided to rotate the tube (not shown). The rotation mechanism may also use recoil devices. The mixer blades and blade carrier of the invention are not shown because they are inside the tube.

Figure 2:
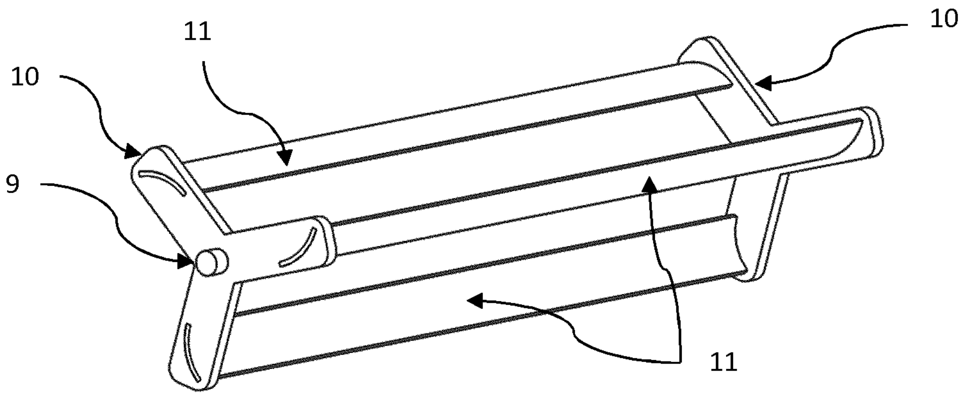
FIG. 2 illustrates a mixer assembly.

FIG. 2 shows a mixer assembly which may be used in the tube (3) of FIG. 1. A mixer assembly support pin (9) is located on either end of the assembly (only visible at one end). These pins support the blade assembly within the tube. It is preferred that this pin is cylindrical and smooth to permit free rotation. It may also be of a shape which allows a limited degree of free rotation. The mixer assembly support pin (9) is fixed to each of the two blade carriers (10) which are located within the tube at the two ends of the tube (3). Three mixer blades (11) are supported at each end of the tube by the two blade carriers (10).

Figure 3:
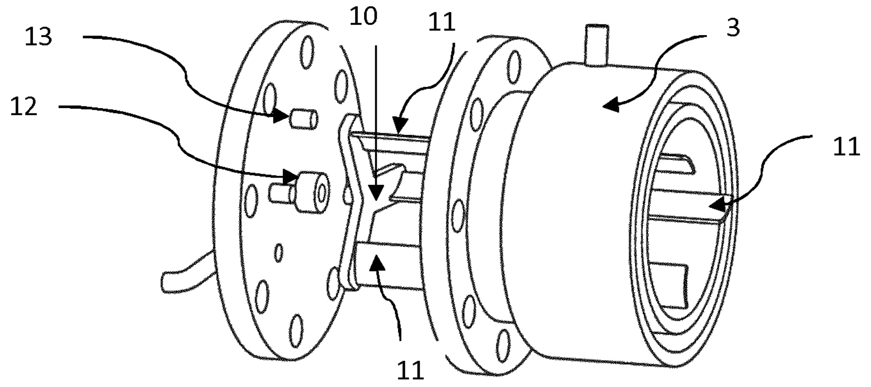
FIG. 3 illustrates an exploded view at an end of a mixing system as shown in FIG. 1.

FIG. 3 shows an exploded view of one end of the assembly shown in FIG. 1. A blade assembly support boss (12) is fixed directly or indirectly to the interior end of tube. It may be mounted on the end flange but may also be supported by a second flange between the tube and the end flange or internally by the tube. The support boss (12) has a circular surface to carry the mixer assembly support pin (9). It may also be of a shape which allows a limited degree of free rotation of the mixer assembly support pin (9). The arrangement shows the mixer boss as female and the mixer assembly support pin as male but it may be the other way round. Mixer assembly travel stops (13) are mounted on the end flange. These limit the degree of free rotation of the mixer assembly within the tube. As with the blade assembly support boss (12) these may be fixed on a carrier plate or internally by the tube. The blade assembly is as shown in FIG. 2 and may be locked in position relative to the tube but a degree of free rotation as described below is preferred.

Figure 4:
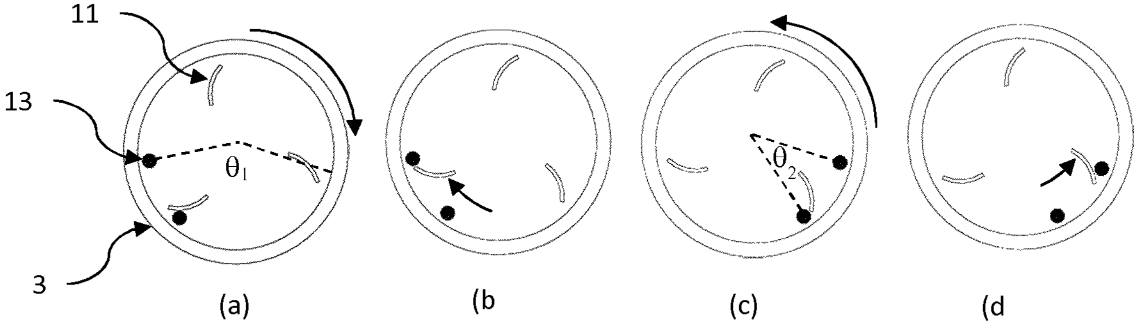
FIG. 4 illustrates operation of travel stops.

FIG. 4 shows the operation of the travel stops (13) as the tube rotates. A single travel stop can be used but two travel stops are preferred. Travel stops (13) are stationary relative to the tube. By having these stops spaced apart, the mixer blade assemblies are free to rotate relative to the tube by the desired angle when the direction of the tube rotation is changed. The tube (3) is rotated clockwise in FIG. 3 (*a*) and anti-clockwise in FIG. 3 (*c*). In these phases the rotation of mixer blade assembly as shown in FIG. 2 is driven by the travel stops. FIGS. 3 (*b*) and (*d*) show the periods when the direction of rotation is changed. In these phases the rotation of the mixer assembly in relation to the tube (3) is driven by the fluid. The tube drive stroke causes rotational movement of the fluid and imparts mixing energy in the bulk fluid. The mixing energy is highest when the mixer blade assembly changes direction. The fluid drive stroke creates shear between the mixer blades (11) and the inner wall of tube (3). This gives enhanced heat transfer performance.

Figure 5:
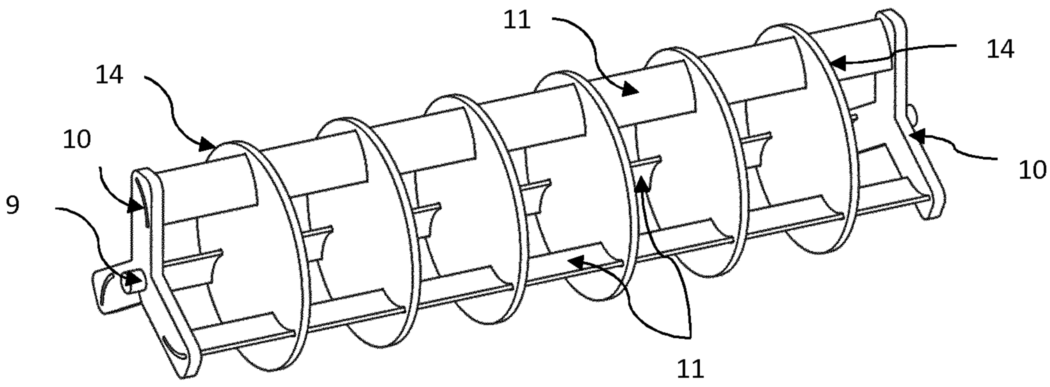
FIG. 5 illustrates a mixer assembly.

FIG. 5 shows a mixer blade assembly of FIG. 2 provided with baffles (14). The baffles serve to limit axial mixing thereby giving improved orderly flow.

The invention claimed is:

1. A mixer system comprising:
- a) a tube which is sealed and rotatable in arcs around a longitudinal axis of the tube, wherein the tube includes:
  - i) a first end;
  - ii) a second end opposing the first end;
  - ii) a tube wall; and
  - iii) one or more inlets and one or more outlets for a process fluid;
- b) a mixing element within the tube and having:
  - i) a plurality of blade carriers, including:
    - i1) a first blade carrier located at the first end of the tube and rotatably mounted to the first end of the tube or a first end flange at the first end of the tube;
    - i2) a second blade carrier located at the second end of the tube and rotatably mounted to the second end of the tube or a second end flange at the second end of the tube;
  - ii) a plurality of blades, each blade having a first end and a second end opposing the first end, wherein the plurality of blades are mounted at the first end to the first blade carrier and mounted at the second end to the second blade carrier;
  - iii) a center of rotation which is concentric with a center of the tube;
  - wherein the plurality of blade carriers are mounted so that the plurality of blades are not touching the tube wall of the tube;
  - wherein the mixer system is free of a shaft which extends between the first blade carrier and the second blade carrier to support the plurality of blades; and
  - wherein the plurality of blade carriers are supported within the tube in a manner that allows the plurality of blades to rotate in a same direction and angular velocity as the tube rotates in the arcs.

2. The mixer system according to claim 1, wherein the mixing element is free to rotate at a different angular velocity to the tube during a transition phase between one arc of rotation of the tube and a next arc of rotation of the tube.

3. The mixer system according to claim 1, wherein the plurality of blades are fixed relative to the plurality of blade carriers.

4. The mixer system according to claim 1, wherein the mixing element is free to rotate but a degree of free rotation is limited by one or more travel stops.

5. The mixer system according to claim 1, wherein a length of the tube is between 500 mm and 2 meters.

6. The mixer system according to claim 1, wherein the plurality of blades are mounted on the plurality of blade carriers such that the plurality of blades are positioned between the center of the tube and the tube wall; and wherein the plurality of blades occupy an outer 70% of a radius of the tube.

7. The mixer system according to claim 1, wherein the plurality of blades are mounted at a distance of not more than 25 mm from an inner surface of the tube wall.

8. The mixer system according to claim 1, wherein the plurality of blades are straight in an axial plane and are bent or curved in a radial plane.

9. The mixer system according to claim 1, wherein one or more travel stops are fitted to an external surface of the tube; and wherein the one or more travel stops are based on sensors that signal a drive system to stop rotation in a given direction.

10. The mixer system according to claim 1, wherein a plurality of mixing element travel stops are used to restrict free rotational movement of the plurality of blade carriers.

11. The mixer system according to claim 1 provided with one or more radial baffles along an internal length of the tube.

12. The mixer system of claim 1, wherein the plurality of blades each have a longitudinal axis parallel with the longitudinal axis of the tube; and wherein each end of the plurality of blades is affixed to the plurality of blade carriers such that the plurality of blade carriers are transverse to the longitudinal axis of the plurality of blades.

13. The mixer system of claim 1, wherein the tube includes the first end flange and the second end flange;

wherein the first blade carrier and the second blade carrier each include a support pin;

wherein the support pin of the first blade carrier is rotatably affixed to the first end flange; and wherein the support pin of the second blade carrier is rotatably affixed to the second end flange.

14. The mixer system of claim 13, wherein the tube includes a first support boss as part of the first end or the first end flange and a second support boss as part of the second end or the second end flange; and wherein the support pin of the first blade carrier is carried within the first support boss and the support pin of the second blade carrier is carried within the second support boss.

15. A mixing process comprising:

a) delivering a process fluid to a tube which is sealed, wherein the tube is provided with:

i) a first end flange at a first end of the tube;

ii) a second end flange at a second end of the tube opposing the first end;

iii) a tube wall; and iv) one or more inlets and one or more outlets;

b) rotating the tube in arcs around a longitudinal axis of the tube; wherein the tube contains a mixing element comprising:

i) a plurality of blade carriers, including:

i1) a first blade carrier located at the first end of the tube and rotatably mounted to the first end flange of the tube;

i2) a second blade carrier located at the second end of the tube and rotatably mounted to the second end flange of the tube;

ii) a plurality of blades having a first end and a second end opposing the first end, wherein the plurality of blades are mounted at the first end to the first blade carrier and mounted at the second end to the second blade carrier;

iii) a center of rotation which is concentric with a center of the tube;

wherein the plurality of blade carriers are mounted so that the plurality of blades are not touching the tube wall;

wherein the tube and the mixing element are free of a shaft which extends between the first blade carrier and the second blade carrier to support the blades;

wherein the plurality of blade carriers are supported within the tube in a manner whereby the plurality of blades rotate in a same direction and angular velocity as the tube rotates in the arcs to thereby effect mixing of the process fluid; and wherein the plurality of blades are straight in an axial plane are bent or curved in a radial plane.

16. The mixing process according to claim 15, wherein the mixing element is free to rotate at a different angular velocity to the tube during a transition phase between one arc of rotation of the tube and a next arc of rotation of the tube.

17. The mixing process according to claim 15, wherein the plurality of blades are mounted at a distance of not more than 25 mm from an inner surface of the tube wall.

18. A mixer system comprising:

a) a tube which is sealed and is rotatable in arcs around a longitudinal axis of the tube, wherein the tube includes:

i) a first end flange at a first end of the tube;

ii) a second end flange at a second end of the tube opposing the first end;

iii) a tube wall; and iv) one or more inlets and one or more outlets for a process fluid;

b) a mixing element within the tube and having:

i) a plurality of blade carriers, including:

i1) a first blade carrier located at the first end of the tube and rotatably mounted to the first end flange of the tube;

i2) a second blade carrier located at the second end of the tube and rotatably mounted to the second end flange of the tube;

ii) plurality of blades having a first end and a second end opposing the first end, wherein the plurality of blades are mounted at the first end to the first blade carrier and mounted at the second end to the second blade carrier;

iii) a center of rotation which is concentric with a center of the tube;

wherein the plurality of blade carriers are mounted so that the plurality of blades are not touching walls of the tube;

wherein the mixer system is free of a shaft which extends between the first blade carrier and the second blade carrier to support the plurality of blades;

wherein the plurality of blades each have a longitudinal axis parallel with the longitudinal axis of the tube;

wherein the plurality of blade carriers are supported within the tube in a manner that allows the plurality of blades to rotate in a same direction and angular velocity as the tube rotates in the arcs, and wherein the plurality of blades are straight in an axial plane and are bent or curved in a radial plane.

19. The mixer system of claim 18, wherein the first blade carrier and the second blade carrier each include a support pin;

wherein the support pin of the first blade carrier is rotatably affixed to the first end flange; and wherein the support pin of the second blade carrier is rotatably affixed to the second end flange.

20. The mixer system of claim 19, wherein the tube includes a first support boss as part of the first end flange and a second support boss as part of the second end flange;

wherein the support pin of the first blade carrier is carried within the first support boss and able to rotate within the first support boss; and wherein the support pin of the second blade carrier is carried within the second support boss and able to rotate within the second support boss.

* * * * *